US012240330B2

(12) United States Patent
Bernatchez et al.

(10) Patent No.: US 12,240,330 B2
(45) Date of Patent: Mar. 4, 2025

(54) SYSTEMS AND METHODS FOR CUSTOMIZING A PERFORMANCE CHARACTERISTIC OF A VEHICLE

(71) Applicant: TAIGA MOTORS INC., Lasalle (CA)

(72) Inventors: Gabriel Bernatchez, Montreal (CA); Samuel Bruneau, Montreal (CA)

(73) Assignee: TAIGA MOTORS INC., Lasalle (CA)

( * ) Notice: Subject to any disclaimer, the term of this patent is extended or adjusted under 35 U.S.C. 154(b) by 268 days.

(21) Appl. No.: 17/698,381

(22) Filed: Mar. 18, 2022

(65) Prior Publication Data

US 2022/0314818 A1 Oct. 6, 2022

Related U.S. Application Data

(60) Provisional application No. 63/168,498, filed on Mar. 31, 2021.

(51) Int. Cl.
*G06F 17/00* (2019.01)
*B60L 15/20* (2006.01)
(Continued)

(52) U.S. Cl.
CPC ............... *B60L 15/20* (2013.01); *B60L 50/60* (2019.02); *B62M 27/02* (2013.01);
(Continued)

(58) Field of Classification Search
CPC ...... B60L 15/20; B60L 50/60; B60L 2200/12; B60L 2200/32; B60L 2240/14;
(Continued)

(56) References Cited

U.S. PATENT DOCUMENTS 6,772,061 B1 8/2004 Berthiaume et al.
7,357,120 B2 4/2008 Kaji
(Continued)

FOREIGN PATENT DOCUMENTS

AU 2013329774 A1 * 4/2015 ............. B60K 28/16
CA 3140006 A1 * 11/2015 ............. B64C 13/18
(Continued)

OTHER PUBLICATIONS

Motor Vector Control Based on Speed-Torque-Current Map (Year: 2019).*
(Continued)

*Primary Examiner* — Ronnie M Mancho
(74) *Attorney, Agent, or Firm* — Norton Rose Fulbright Canada LLP

(57) ABSTRACT

Systems and methods for customizing one or more performance characteristics of a vehicle are provided. The systems and methods may be used with electric powersport vehicles and may facilitate expanded customization capabilities and a wide range of operator experiences available with the vehicle. A method of operating an electric vehicle includes receiving, via an operator interface, a value of an individually-variable parameter defining a propulsive performance characteristic of the electric vehicle, and, when the electric motor is driven to propel the vehicle, regulating an output of the electric motor based on the value of the individually-variable parameter.

22 Claims, 12 Drawing Sheets

(51) Int. Cl.
  *B60L 50/60* (2019.01)
  *B62M 27/02* (2006.01)
(52) U.S. Cl.
  CPC ....... *B60L 2200/12* (2013.01); *B60L 2200/32* (2013.01); *B60L 2240/14* (2013.01); *B60L 2240/421* (2013.01); *B60L 2240/423* (2013.01); *B60L 2240/622* (2013.01); *B60L 2240/70* (2013.01); *B60L 2250/16* (2013.01)
(58) Field of Classification Search
  CPC ......... B60L 2240/421; B60L 2240/423; B60L 2240/622; B60L 2240/70; B60L 2250/16; B60L 2200/24; B60L 2240/12; B60L 2250/12; B62M 27/02; B62K 2204/00
  USPC .......................................................... 701/22
  See application file for complete search history.

(56) References Cited

U.S. PATENT DOCUMENTS

| | | | |
|---|---|---|---|
| 8,907,629 | B2 | 12/2014 | Kelty et al. |
| 9,151,384 | B2 * | 10/2015 | Kohler .............. F16H 61/66259 |
| 9,722,518 | B2 | 8/2017 | Schlulz et al. |
| 2020/0140037 | A1 | 5/2020 | Haavikko et al. |
| 2020/0193748 | A1 | 6/2020 | Konicek et al. |
| 2022/0009589 | A1 | 1/2022 | Matsushita |
| 2022/0017181 | A1 | 1/2022 | Suzuki et al. |
| 2022/0063764 | A1 | 3/2022 | Matsushita |
| 2022/0111929 | A1 | 4/2022 | Matsushita |
| 2022/0314818 | A1 * | 10/2022 | Bernatchez ............ B62M 27/02 |
| 2022/0397194 | A1 * | 12/2022 | Kohler .............. F16H 61/66259 |

FOREIGN PATENT DOCUMENTS

| | | | | |
|---|---|---|---|---|
| CA | 3039800 | A1 * | 5/2018 | ............ B66F 17/003 |
| CA | 2907399 | C * | 5/2022 | ................ B60K 6/20 |
| CA | 3113909 | C * | 1/2023 | |
| JP | 3991502 | B2 * | 10/2007 | ............ B60K 6/543 |
| WO | WO-2005030550 | A1 * | 4/2005 | ............ B60L 11/123 |
| WO | 2021084520 | A2 | 5/2021 | |

OTHER PUBLICATIONS

Canadian Intellectual Property Office, Examiner's Requisition dated May 11, 2022 re: Canadian patent application No. 3,113,909.

* cited by examiner

| Operator ID | Parameter 1 | Parameter 2 | Parameter 3 |
|---|---|---|---|
| OP1 | V1 | V2 | V3 |
| OP2 | V4 | V5 | V6 |
| OP3 | V7 | V8 | V9 |

FIG. 4

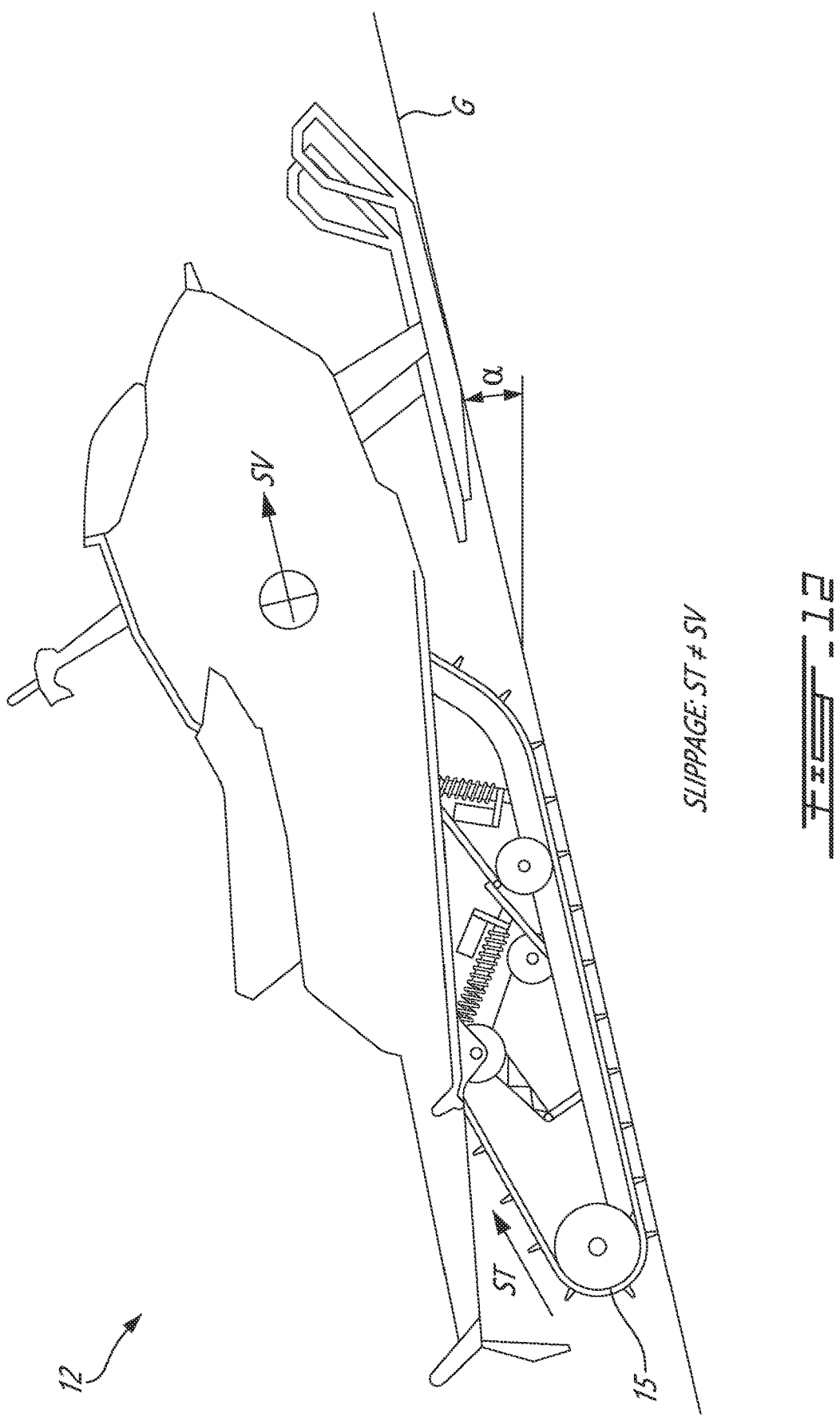

SYSTEMS AND METHODS FOR CUSTOMIZING A PERFORMANCE CHARACTERISTIC OF A VEHICLE

CROSS-REFERENCE TO RELATED APPLICATION AND CLAIM OF PRIORITY

The present application claims priority to U.S. Provisional Patent Application Ser. No. 63/168,498 filed on Mar. 31, 2021, the entire contents of which are hereby incorporated by reference.

TECHNICAL FIELD

The disclosure relates generally to the operation of vehicles, and more particularly to customizing performance characteristics of vehicles.

BACKGROUND

Some vehicles provide a few selectable factory-defined operational modes for the vehicles such as economy mode, normal mode, or sport mode to provide different operator experiences with the vehicle. However, the factory-defined operational modes are associated with predefined and fixed settings that limit the operator experiences to only the few factory-defined operational modes available. Improvement is desirable.

SUMMARY

In one aspect, the disclosure describes a method of operating an electric powersport vehicle based on an operator-defined propulsive performance characteristic of the electric vehicle. The method comprises:
  receiving, via an operator interface, a value of an individually-variable parameter defining the propulsive performance characteristic of the electric vehicle;
  receiving a command for propelling the electric vehicle;
  driving an electric motor of the electric vehicle to propel the electric vehicle based on the command; and
  when the electric motor is being driven, regulating an output of the electric motor based on the value of the individually-variable parameter.

The value may include a numerical value. The value may include a relative value.

The parameter may include an operator-defined operational limit of the electric vehicle. The parameter may be an operator-defined maximum speed of the electric vehicle. The parameter may be indicative of an operator-defined maximum acceleration of the electric vehicle. The parameter may be indicative of an operator-defined maximum output power of a powertrain of the electric vehicle. The parameter may be indicative of an operator-defined maximum output torque of the electric motor. The parameter may be indicative of an operator-defined maximum amount of slippage allowable between a ground-engaging member of the electric vehicle and a ground.

The electric vehicle may be a snowmobile. The ground-engaging member may include a track of the snowmobile.

The parameter may be indicative of a difference between a theoretical speed of the electric vehicle determined from an operating speed of a powertrain of the electric vehicle, and an estimated actual speed of the electric vehicle. The method may include determining the estimated actual speed of the electric vehicle using a satellite navigation device.

The parameter may be two-dimensional. The value may include two coordinates. One of the coordinates may include an operating speed of the electric motor. One of the coordinates may include an actuation position of an accelerator of the electric vehicle. One of the coordinates may include an output torque of the electric motor. One of the coordinates may include an acceleration of the electric vehicle.

The parameter may be part of a throttle map associated with an accelerator of the electric vehicle.

The value may include one or more points along a graph of a relationship between two variables. One of the two variables may include an output torque of the electric motor. One of the two variables may include an actuation position of the accelerator.

The parameter may be indicative of a throttle map associated with an accelerator of the electric vehicle.

The parameter may be indicative of a torque curve associated with the electric motor.

The parameter may be indicative of a regeneration behaviour of the electric vehicle.

The method may include: verifying whether the value of the parameter is within a predefined range; and when the value is outside the predefined range, preventing regulating the output of the electric motor based on the value of the parameter.

The parameter may be a first individually-variable parameter. The predefined range may be variable based on a value of a second individually-variable parameter.

The value of the parameter may be associated with an operator identification. The method may include verifying an identity of an operator before regulating the output of the electric vehicle based on the value of the individually-variable parameter.

Verifying the identity of the operator may include detecting a portable electronic device of the operator in proximity to the electric vehicle. Verifying the identity of the operator may include detecting a key associated with the operator.

The value of the individually-variable parameter may be a first value of a first individually-variable parameter. The method may include: receiving a second value of a second individually-variable parameter; and regulating the output of the electric motor based on the first and second values of the respective first and second individually-variable parameters.

The method may include receiving, via an operator interface, a plurality of values of respective individually-variable parameters, the individually-variable parameters including at least two of the following: an operator-defined maximum speed of the electric vehicle, an operator-defined maximum acceleration of the electric vehicle, an operator-defined maximum output torque from the electric motor, an operator-defined torque curve associated with the electric motor, and an operator-defined maximum output power from the electric motor; and regulating the output of the electric motor based on the plurality of values of the respective individually-variable parameters.

The electric vehicle may be a powersport vehicle.

Embodiments may include combinations of the above features.

In another aspect, the disclosure describes a computer program product for implementing an operation of an electric vehicle according to an operator-defined propulsive performance characteristic of the electric vehicle.

In another aspect, the disclosure describes a system for customizing a propulsive performance characteristic of an electric vehicle. The system comprises:

an operator interface facilitating input of a value of an individually-variable parameter defining the propulsive performance characteristic of the electric vehicle;

one or more data processors operatively connected to the operator interface; and non-transitory machine-readable memory storing instructions executable by the one or more data processors and configured to cause the one or more data processors to:

cause an electric motor of the electric vehicle to be driven to propel the electric vehicle; and when the electric motor is being driven, cause an output of the electric motor to be regulated based on the value of the individually-variable parameter.

The value may include a numerical value. The value may include a relative value.

The parameter may be a slip ratio associated with a ground-engaging member of the electric vehicle. The ground-engaging member may include a track of a snowmobile.

The parameter may be two-dimensional. The value may include two coordinates.

The value may include one or more points along a graph of a relationship between two variables. One of the two variables may include an output torque of the electric motor. One of the two variables may include a displacement of the accelerator.

Embodiments may include combinations of the above features.

In another aspect, the disclosure describes a powersport vehicle comprising a system as described herein.

In another aspect, the disclosure describes an electric powersport vehicle with operator-defined propulsive performance characteristics. The electric powersport vehicle comprises:

a powertrain for propelling the electric powersport vehicle, the powertrain including an electric motor and a battery for supplying electric power to the electric motor;

an accelerator for receiving a command for propelling the electric vehicle from an operator of the electric powersport vehicle; and a controller operatively connected to the accelerator and to the powertrain, the controller being configured to:

receive an operator-defined value of an individually-variable parameter defining the propulsive performance characteristic of the electric vehicle;

in response to the command received at the accelerator, cause the electric motor to be driven to propel the electric vehicle based on the command; and when the electric motor is being driven, cause an output of the electric motor to be regulated based on the value of the individually-variable parameter.

The value may include a numerical value.

The parameter may be indicative of a difference between a theoretical speed of the electric vehicle determined from an operating speed of the powertrain, and an estimated actual speed of the electric powersport vehicle. The electric powersport vehicle may include a satellite navigation device operatively connected to the controller for estimating the actual speed of the electric powersport vehicle.

The electric powersport vehicle may include a wireless data receiver operatively connected to the controller for receiving the operator-defined value of the individually-variable parameter.

The parameter may be two-dimensional. The value may include two coordinates.

The parameter may be indicative of a throttle map defining a relationship between an actuation position of the accelerator and an output of the electric motor.

The parameter may be indicative of at least one of the following: an operator-defined maximum speed of the electric vehicle, an operator-defined maximum acceleration of the electric vehicle, an operator-defined maximum output torque from the electric motor, an operator-defined torque curve associated with the electric motor, and an operator-defined maximum output power from the electric motor.

The electric powersport vehicle may be a snowmobile.

Embodiments may include combinations of the above features.

In another aspect, the disclosure describes a computer program product for implementing an operation of an electric powersport vehicle according to an operator-defined propulsive performance characteristic of the electric powersport vehicle, the computer program product comprising a non-transitory computer readable storage medium having program code embodied therewith, the program code readable and executable by a computer, processor or logic circuit to perform a method comprising:

facilitating receiving a value of an operator-defined individually-variable parameter defining the propulsive performance characteristic of the electric vehicle;

causing an electric motor of the electric vehicle to be driven to propel the electric vehicle; and when the electric motor is being driven, causing an output of the electric motor to be regulated based on the value of the individually-variable parameter.

In another aspect, the disclosure describes a method of operating a powersport vehicle. The method may comprise:

receiving a value indicative of a maximum amount of slippage allowable between a ground-engaging member of the powersport vehicle and a ground;

receiving a command for propelling the powersport vehicle;

driving a powertrain of the powersport vehicle to propel the vehicle based on the command; and when the powertrain is being driven, regulating an output of the powertrain based on the value indicative of the maximum amount slippage.

The method may include determining an actual amount of slippage between the ground-engaging member of the powersport vehicle and the ground; and regulating the output of the powertrain to maintain the actual amount of slippage at or below the maximum amount slippage. Determining the actual amount of slippage may include using a theoretical speed of the powersport vehicle determined from an operating speed of the powertrain of the powersport vehicle, and an estimated actual speed of the powersport vehicle. Determining the estimated actual speed of the powersport vehicle may be performed using a satellite navigation device. The value of the maximum amount slippage may be operator-defined.

The powertrain may include an electric motor for propelling the powersport vehicle. Regulating the output of the powertrain may include regulating an output of the electric motor.

The powersport vehicle may be a snowmobile.

Embodiments may include combinations of the above features.

In another aspect, the disclosure describes an electric snowmobile comprising:
- a ground-engaging track;
- an electric motor drivingly coupled to the ground-engaging track to propel the snowmobile via the ground-engaging track;
- a battery for supplying electric power to the electric motor;
- an accelerator for receiving a command for propelling the snowmobile; and
- a controller operatively connected to the accelerator and to the electric motor, the controller being configured to:
- receive an operator-defined value indicative of a maximum amount of slippage allowable between the track and a ground;
- in response to the command received at the accelerator, cause the electric motor to be driven based on the command; and
- when the electric motor is being driven, cause an output of the electric motor to be regulated based on the value indicative of the maximum amount of slippage.

The controller may be configured to: determine an actual amount of slippage between the track and the ground; and cause the output of the electric motor to be regulated to maintain the actual amount of slippage at or below the maximum amount slippage.

The controller may be configured to determine the actual amount of slippage using a theoretical speed of the snowmobile determined from an operating speed of the electric motor, and an estimated actual speed of the snowmobile.

The electric snowmobile may comprise a satellite navigation device operatively connected to the controller.

Embodiments may include combinations of the above features.

In another aspect, the disclosure describes a method of operating an electric vehicle based on an operator-defined propulsive performance characteristic of the electric vehicle. The method comprises:
- receiving a first operator-defined value of an individually-variable parameter defining the propulsive performance characteristic of the electric vehicle;
- storing the first value against a first operator-defined operational mode;
- receiving a second operator-defined value of the individually-variable parameter defining the propulsive performance characteristic of the electric vehicle;
- storing the second value against a second operator-defined operational mode;
- driving an electric motor of the electric vehicle to propel the electric vehicle according to the first or second operational mode;
- when the electric motor is driven according to the first operational mode, regulating an output of the electric motor based on the first value of the individually-variable parameter; and
- when the electric motor is being driven according to the second operational mode, regulating the output of the electric motor based on the second value of the individually-variable parameter.

The parameter may be two-dimensional. The value may include two coordinates.

The individually-variable parameter may be indicative of a throttle map associated with an accelerometer accelerator of the electric vehicle.

The value may includes one or more points along a graph of a relationship between two variables. One of the two variables may include an output torque of the electric motor.

The first operator-defined operational mode may be associated with a first operator identification. The second operator-defined operational mode may be associated with a second operator identification. The method may include: verifying an identity of the operator; and automatically selecting the first or second operational mode for driving the electric motor based on the identity of the operator.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 4 shows a table including values of operating parameters associated with different operators of a vehicle;

FIG. 12 is a schematic representation of the powersport vehicle of FIG. 1 with a ground-engaging track of the vehicle exhibiting slippage.

DETAILED DESCRIPTION

The following disclosure describes systems and methods for customizing (i.e., personalizing, tuning) operating characteristics of vehicles. In some embodiments, the systems and methods may be particularly suited for (e.g., powersport) electric vehicles but it is understood that some aspects of present disclosure are also applicable to powersport vehicles that are propelled by internal combustion engines. In some embodiments, the customization of operating characteristics may be achieved by way of operator-defined and individually-variable operating parameters of a vehicle.

Compared to having only a few factory-defined operational modes (e.g., economy, normal and sport modes) or factory-defined performance levels (e.g., novice, intermediate and expert) that come with fixed factory-defined sets of operating parameters, the use of specific individually-variable operating parameters as described herein may facilitate expanded customization capabilities and a wide range of operator experiences available with the vehicle. The use of individually-variable operating parameters may provide more granularity in the customization and provide more freedom to an operator (or custodian of the vehicle) in tailoring the performance characteristics of their vehicle based on operator preferences, operator experience levels, and/or on the conditions in which the vehicle is operated for example.

In some embodiments, the individually-variable operating parameters may be variable on an individual basis by an operator of the vehicle. In other words, one or more individually-variable operating parameters may be defined independently and separately from each other by an operator to provide tuning flexibility to the operator. The ability to vary operating parameters in this manner may, for example, be used to restrict or expand the propulsive performance of the vehicle.

The terms "connected" and "coupled to" may include both direct connection or coupling (in which two elements contact each other) and indirect connection or coupling (in which at least one additional element is located between the two elements).

The term "substantially" as used herein may be applied to modify any quantitative representation which could permissibly vary without resulting in a change in the basic function to which it is related.

Aspects of various embodiments are described through reference to the drawings.

Figure 1:
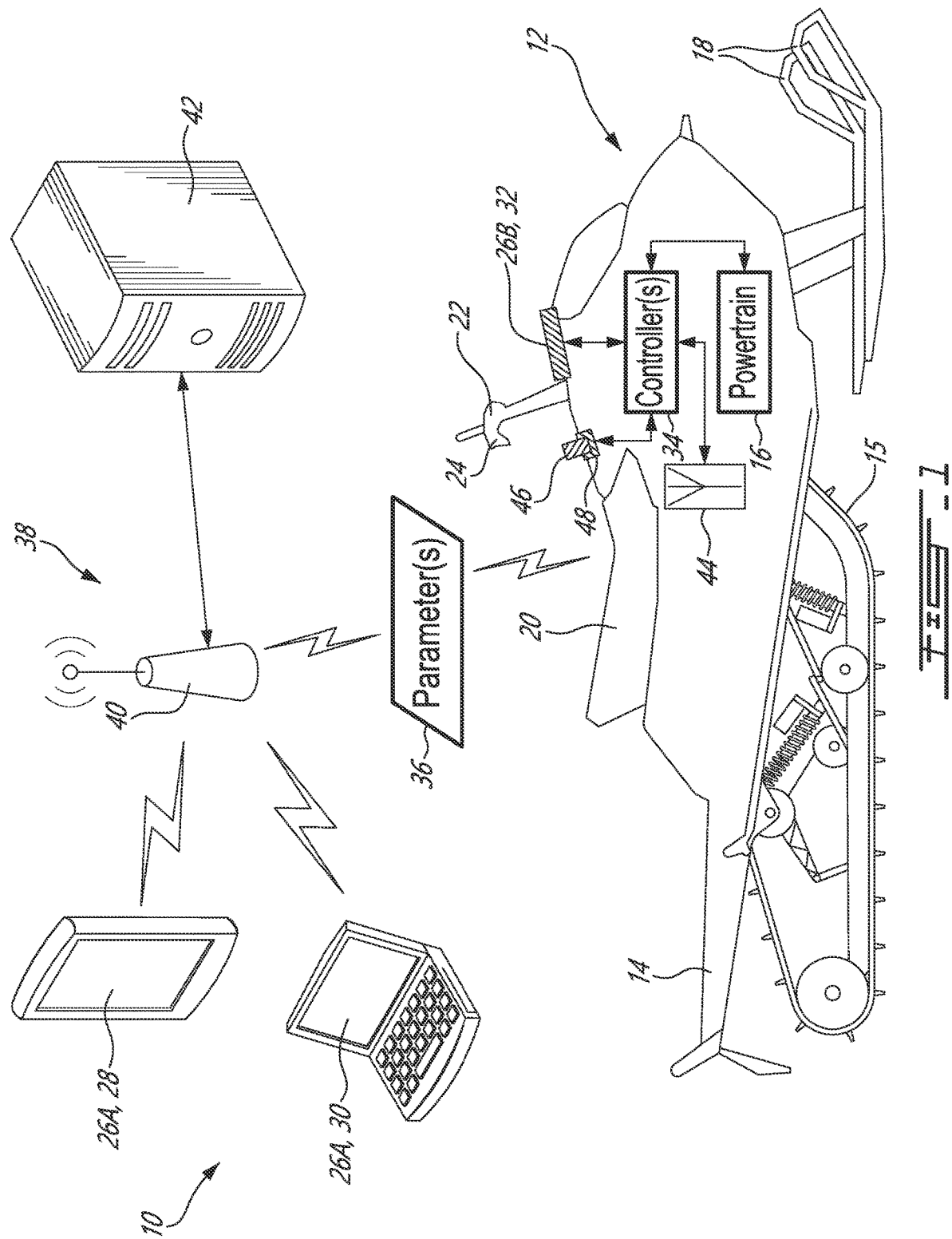
FIG. 1 is a schematic representation of a powersport vehicle with customizable operating parameters.

FIG. 1 is a schematic representation of an exemplary system 10 facilitating operator customization of one or more performance characteristics of electric powersport vehicle 12 (referred hereinafter as "vehicle 12"). Vehicle 12 may be a snowmobile but it is understood that the systems described herein may also be used on other types of electric vehicles such as electric (e.g., side-by-side) utility task vehicles (UTVs), electric motorcycles, electric all-terrain vehicles (ATVs), and electric personal watercraft (PWCs). In some embodiments, the systems described herein may also be used on electric (e.g., outboard) boat motors. Vehicle 12 may include elements of the snow vehicle described in International Patent Application no. WO 2019/049109 A1 (Title: BATTERY ARRANGEMENT FOR ELECTRIC SNOW VEHICLES), which is incorporated herein by reference.

Vehicle 12 may include a frame (also known as a chassis) which may include tunnel 14, track 15 having the form of an endless belt for engaging the ground and disposed under tunnel 14, powertrain 16 mounted to the frame and configured to drive track 15, left and right skis 18 disposed in a front portion of vehicle 12, and straddle seat 20 disposed above tunnel 14 for accommodating an operator (not shown) of vehicle 12 and optionally one or more passengers (not shown). Skis 18 may be movably attached to the frame to permit steering of vehicle 12 via a steering assembly including a steering column interconnecting handlebar 22 with skis 18. Powertrain 16 of vehicle 12 may be electrically powered and driven based on an actuation and displacement of accelerator 24, also referred to as "throttle", by the operator. Accelerator 24 may be an actuatable finger lever, a thumb lever, a rotatable handgrip, or a foot pedal depending on the type of vehicle.

In various embodiments, system 10 may be partially or entirely integrated with vehicle 12. System 10 may include one or more external operator interfaces 26A provided via smartphone 28, laptop computer 30, or other portable electronic device suitable for data communication with controller 34 of vehicle 12. External operator interface 26A may be in wired or wireless data communication with controller 34. Alternatively or in addition, system 10 may include one or more onboard operator interfaces 26B such as instrument panel 32. Operator interfaces 26A, 26B may facilitate the input of one or more values of respective one or more individually-variable parameters 36 defining respective performance characteristics of vehicle 12 for use by controller 34 of vehicle 12.

Smartphone 28 and/or laptop computer 30 may be in direct (e.g., via Bluetooth®) or indirect wireless data communication with controller 34. For example, smartphone 28 and/or laptop computer 30 may communicate with controller 34 via a suitable communication network 38, which may include a local area network (LAN), wide area network (WAN), cellular network, internet-based network, satellite-based network, Wi-Fi or other suitable type of network. For example, external operator interface 26A may include a webpage provided by a website and displayed to the operator using a web browser via smartphone 28 and/or via laptop computer 30. External operator interface 26A may be provided via an application (app) running on smartphone 28 and/or on laptop computer 30. In some embodiments, network 38 may include one or more network antennas 40 and one or more servers 42 on which parameter(s) 36 may be stored. Controller 34 may be in wireless communication with external operator interface 26A directly or via network 38 using onboard antenna 44.

In some embodiments, system 10 may also include operator key 46 permitting the operation of vehicle 12 when key 46 is received into receptacle 48, or when key 46 is detected to be in sufficient proximity to vehicle 12 for example. Key 46 may provide a unique identifier, such as operator ID 72 referenced below, to controller 34 that may authorize the operation of vehicle 12 and that may identify the operator and/or an operator-defined operational mode associated with key 46.

In some embodiments, operator interfaces 26A, 26B may be provided on a display screen associated with one or more operator input devices such as a keyboard or a cursor control device for example. In some embodiments, operator interfaces 26A, 26B may be provided on a touch-sensitive display screen allowing inputs to be received directly from the operator. In some embodiments, operator interfaces 26A, 26B may include physical (hard) input devices such as knobs, buttons, dials, switches, keypads, trackballs, mice, etc.

Figure 2:
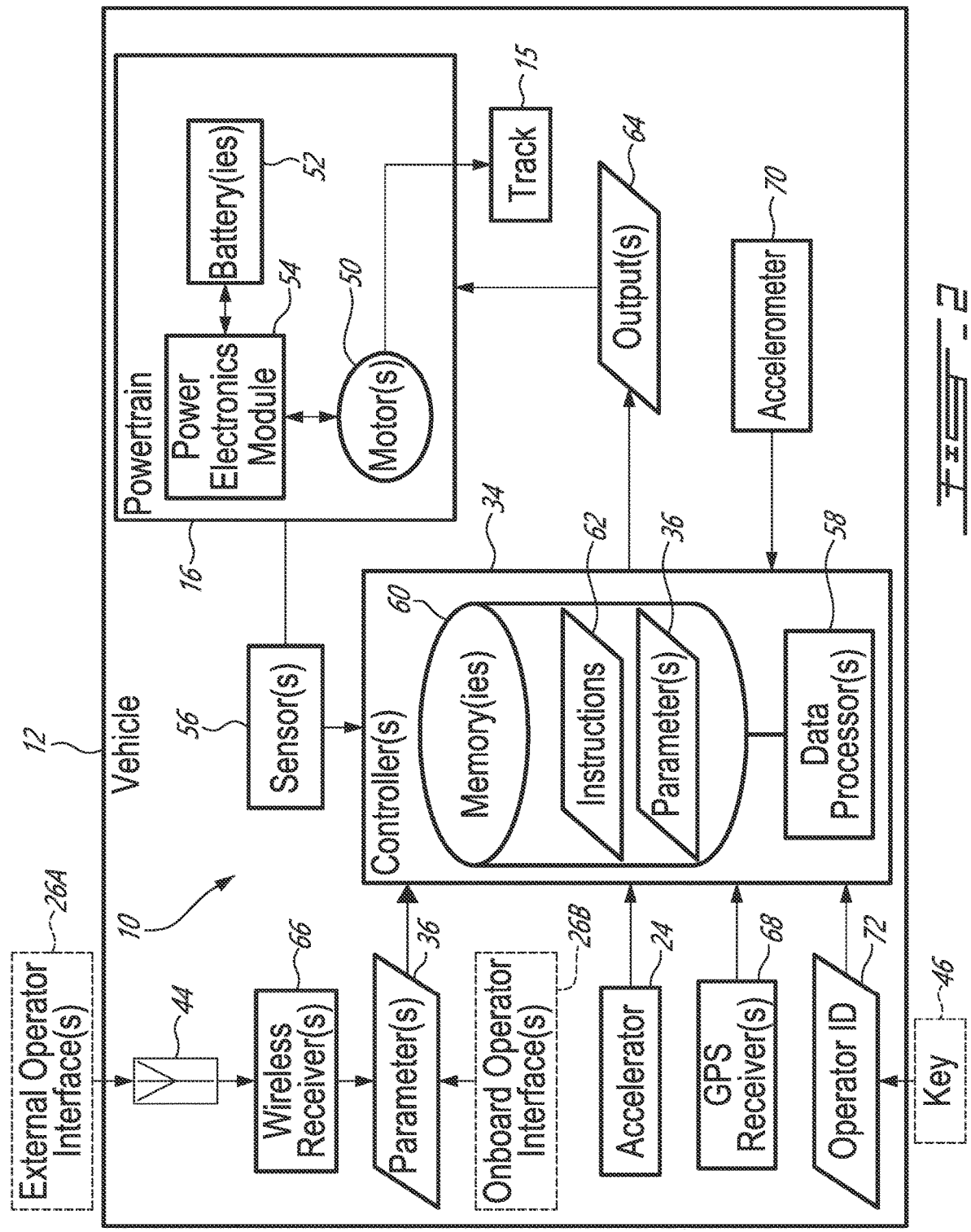
FIG. 2 is a schematic representation of the vehicle of FIG. 1.

FIG. 2 is a schematic representation of vehicle 12. Powertrain 16 may include one or more electric motors 50 (referred hereinafter in the singular as "motor 50") for providing propulsive power to vehicle 12. Motor 50 may include elements of the motor described in U.S. Provisional Patent Application No. 63/135,466 (Title: DRIVE UNIT FOR ELECTRIC VEHICLE) and No. 63/135,474 (Title: DRIVE UNIT WITH FLUID PATHWAYS FOR ELECTRIC VEHICLE), which are incorporated herein by reference.

Motor 50 may be drivingly coupled to track 15 via a drive shaft. Motor 50 may be in torque-transmitting engagement with the drive shaft via a belt/pulley drive, chain/sprocket drive, or shaft/gear drive for example. The drive shaft may be drivingly coupled to track 15 via one or more toothed wheels or other means so as to transfer motive power from motor 50 to track 15. In various embodiments, motor 50 may be a permanent magnet synchronous motor or a brushless direct current motor for example.

For UTVs, motorcycles and ATVs, motor 50 may be drivingly coupled to wheels and tires as ground-engaging members. For a PWC, motor 50 may be drivingly coupled to an impeller. For an outboard boat motor, motor 50 may be drivingly coupled to a propeller.

Powertrain 16 may also include one or more batteries 52 (referred hereinafter in the singular) for providing electric power to motor 50 and driving motor 50. The operation of motor 50 and the delivery of electric power to motor 50 may be controlled by controller 34 via a power electronics module 54 including suitable electronic switches (e.g., insulated gate bipolar transistor(s)) to provide motor 50 with electric power having the desired voltage, current, waveform, etc. to implement the desired performance of vehicle 12 based on an actuation of accelerator 24 by the operator indicating a command to propel vehicle 12. In some embodiments, power electronics module 54 may include a power inverter for example. Battery 52 may include a lithium ion or other type of battery.

Vehicle 12 may include one or more sensors 56 operatively connected to component(s) of powertrain 16. Sensor(s) 56 may be configured to sense one or more parameters of powertrain 16. Controller 34 may be configured to control motor 50 based on feedback received via sensor(s) 56. Controller 34 may include one or more data processors 58 (referred hereinafter as "processor 58") and non-transitory machine-readable memory 60. Controller 34 may be operatively connected to sensor(s) 56 via wired or wireless connections for example so that one or more parameters acquired via sensor(s) 56 may be received at controller 34 and used by processor 58 in one or more procedures or steps defined by instructions 62 stored in memory 60 and executable by processor 58.

Sensor(s) 56 may include one or more current sensors and/or one or more voltage sensors operatively connected to battery 52 and/or connected to power electronics module 54. Sensor(s) 56 may include one or more position sensors (e.g., rotary encoder) and/or speed sensors (e.g., tachometer) suitable for measuring the angular position and/or angular speed of a rotor of motor 50 and/or of another rotating component of powertrain 16. Sensor(s) 56 may include one or more torque sensors (e.g., a rotary torque transducer) for measuring an output torque of motor 50. Alternatively, the output torque of motor 50 may be inferred based on the amount of electric power (e.g., current) being supplied to motor 50 for example.

Controller 34 may carry out additional functions than those described herein. Processor 58 may include any suitable device(s) configured to cause a series of steps to be performed by controller 34 so as to implement a computer-implemented process such that instructions 62, when executed by controller 34 or other programmable apparatus, may cause the functions/acts specified in the methods described herein to be executed. Processor 58 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 60 may include any suitable machine-readable storage medium. Memory 60 may include non-transitory computer readable storage medium such as, for example, but not limited to, an electronic, magnetic, optical, electromagnetic, infrared, or semiconductor system, apparatus, or device, or any suitable combination of the foregoing. Memory 60 may include a suitable combination of any type of machine-readable memory that is located either internally or externally to controller 34. Memory 60 may include any storage means (e.g. devices) suitable for retrievably storing machine-readable instructions 62 executable by processor 58.

Various aspects of the present disclosure may be embodied as systems, devices, methods and/or computer program products. Accordingly, aspects of the present disclosure may take the form of an entirely hardware embodiment, an entirely software embodiment or an embodiment combining software and hardware aspects. Furthermore, aspects of the present disclosure may take the form of a computer program product embodied in one or more non-transitory computer readable medium(ia) (e.g., memory 60) having computer readable program code (e.g., instructions 62) embodied thereon. Computer program code for carrying out operations for aspects of the present disclosure in accordance with instructions 62 may be written in any combination of one or more programming languages. Such program code may be executed entirely or in part by controller 34 or other data processing device(s). It is understood that, based on the present disclosure, one skilled in the relevant arts could readily write computer program code for implementing the methods described and illustrated herein.

Controller 34 may generate output(s) 64 for controlling the operation of powertrain 16 and/or other function(s) of vehicle 12. For example, based on a sensed actuation position of accelerator 24 and operator-defined operating parameter(s) 36 received via external operator interface 26A and/or onboard operator interface 26B, controller 34 may generate output(s) 64 for controlling the delivery of electric power from battery 52 to motor 50 according to instructions 62.

Operating parameter(s) 36 may be received from external operator interface 26A via onboard antenna 44 and one or more wireless receiver 66 (referred hereinafter in the singular). Wireless receiver 66 may be part of a wireless transceiver enabling receipt and transmission of data to and from vehicle 12. Wireless receiver 66 may be configured for wireless data communication at one or more frequencies (e.g., 915 MHZ and/or at 2.4 GHz) with one or more portable electronic devices that may be in communication via network 38 or paired directly with vehicle 12 via onboard antenna 44.

Vehicle 12 may include a satellite navigation device, referred herein as a global positioning system (GPS) receiver 68, operatively connected to controller 34. GPS receiver 68 may be capable of receiving information from global navigation satellite systems (GNSS) satellites that may be used to calculate a geographical position of vehicle 12. The information received at GPS receiver 68 may also be used to calculate an estimated actual velocity of vehicle 12 which may be used by controller 34 to control the operation of motor 50 in some situations.

Vehicle 12 may include accelerometer 70 operatively connected to controller 34. Accelerometer 70 may be suitable for measuring a proper acceleration of vehicle 12. Measurements taken by accelerometer 70 may also be used to calculate an estimated actual velocity of vehicle 12. The measurements taken by accelerometer 70 may be used by controller 34 to control the operation of motor 50 in some situations.

The estimated actual velocity of vehicle 12 may be calculated using a combination of sensor readings (e.g., sensor fusion). For example, measurements taken by accelerometer 70 may be combined with information received from GPS receiver 68 and/or other sensors to calculate an estimated actual velocity of vehicle 12.

System 10 may be used for customizing one or more operating characteristics of vehicle 12 via one or more operator-defined and individually-variable operating parameters 36. In some embodiments, operating parameter(s) 36 may define respective propulsive performance characteristics of vehicle 12. For example, parameter(s) 36 may define output characteristics of powertrain 16 so as to customize the propulsive behaviour of vehicle 12 according to operator preferences. Parameter(s) 36 may define output characteristics of motor 50 when vehicle 12 is being propelled. For example, value(s) of parameter(s) 36 may be stored in memory 60 and used by controller 34 to regulate an output (e.g., torque, speed, power) of motor 50 when motor 50 is being driven to propel vehicle 12.

As explained further below, value(s) of parameter(s) 36 may be associated with different operators of vehicle 12. Accordingly, operator identification (ID) 72 may be received from key 46 or other means and used by controller 34 to retrieve parameter(s) 36 applicable to the specific operator that will be operating vehicle 12.

It is understood that system 10 may also be used with other types of operator-defined and individually-variable parameters associated with other (i.e., non-propulsive) functions of vehicle 12. For example, system 10 may be used with operator-defined operating parameters associated with managing the charging and discharging of battery 52, as well as managing auxiliary functions such as handle bar warmers, and speaker volume, etc.

Compared to having only a few factory-defined operational modes (e.g., economy, normal and sport modes) or factory-defined performance levels (e.g., novice, intermediate and expert) the use of specific individually-variable operating parameters 36 as described herein may facilitate expanded customization capabilities and a wide range of operator experiences available with vehicle 12, 112. For example, the individually-variable operating parameters 36 may be operator-defined on an individual basis and separately of each other. In other words, individually-variable operating parameters 36 may be operator-defined one at a time, or two or more at a time irrespective of one or more other operating parameters 36 of vehicle 12, 112. Accordingly, the use of several individually-variable operating parameters 36 may provide the potential for numerous possible combinations of operator-defined parameters 36 to be used together and provide significantly expanded customization flexibility to the operator.

The use of individually-variable operating parameters 36 as described herein may be implemented on electric powersport vehicles and, in some cases, on other powersport vehicles that that are propelled by internal combustion engines. However, electric vehicles 12, 112 may be more conducive to the use of individually-variable operating parameters 36 and facilitate enhanced customization flexibility compared to vehicles that that are propelled by internal combustion engines. For example, electric vehicles 12, 112 may allow for flexibility and versatility in the operation of electric motors 50, 150 via software used to control the operation and output performance of electric motor 50, 150 based on one, or potentially on a wide range of individually-variable operating parameters 36 that may be used as operator-defined variables within the control software.

Figure 3:
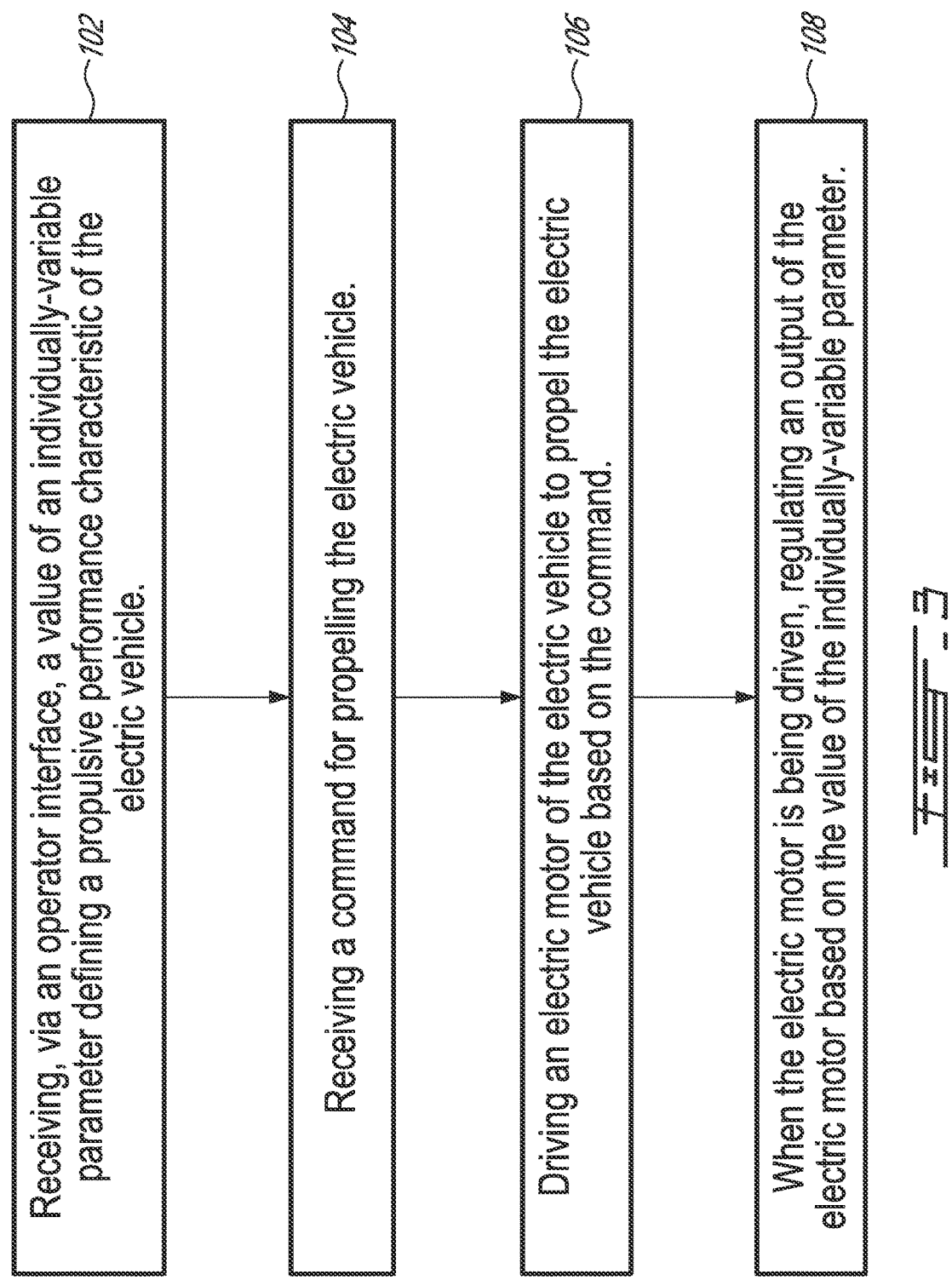
FIG. 3 is a flow diagram of a method of operating an electric vehicle.
Figure 5:
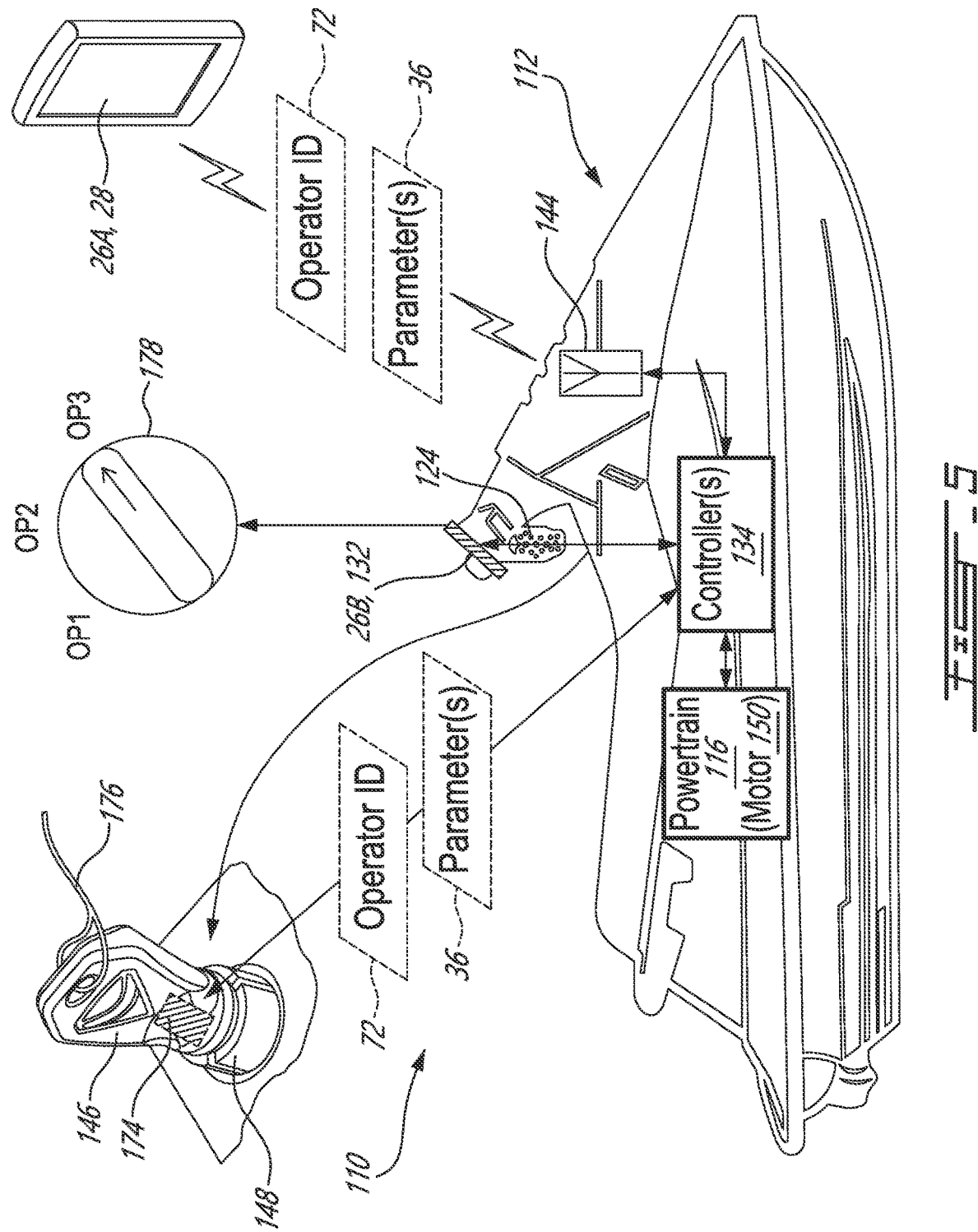
FIG. 5 is a schematic representation of another powersport vehicle with customizable operating parameters.

FIG. 3 is a flow diagram of an exemplary method 100 of operating vehicle 12, or another electric vehicle such as vehicle 112 shown in FIG. 5. For example, machine-readable instructions 62 may be configured to cause controller 34 to perform some or all of method 100. Aspects of method 100 may be combined with aspects of other methods described herein. Aspects of vehicles described herein may also be incorporated into method 100. Method 100 may facilitate the operation of electric vehicle 12 based on one or more operator-defined propulsive performance characteristics of electric vehicle 12. In various embodiments, method 100 may include:

receiving, via operator interface 26A, 26B, a value of an individually-variable parameter 36 defining a propulsive performance characteristic of electric vehicle 12 (block 102);

receiving (e.g., via accelerator 24) a command for propelling electric vehicle 12 (block 104);

driving motor 50 of electric vehicle 12 to propel electric vehicle 12 based on the command (block 106); and when motor 50 is being driven, regulating an output of motor 50 based on the value of the individually-variable parameter 36 (block 108).

Further aspects of method 100 are described below in reference to FIGS. 4-9.

FIG. 4 shows a table including values V1-V9 of operating parameters 36 associated with different operators of vehicle 12. In various embodiments, a single set or multiple sets of operating parameters 36 may be stored in memory 60 or otherwise be available to controller 34. For example, values V1-V3 may represent a first set of operating parameters 36 associated with operator OP1, values V4-V6 may represent a second set of operating parameters 36 associated with operator OP2, and values V7-V9 may represent a third set of operating parameters 36 associated with operator OP3. It is understood that operator ID 72 may not necessarily correspond to different operators but may instead correspond to different operator-defined operational modes that have been previously defined and saved for vehicle 12.

FIG. 5 is a schematic representation of an exemplary system 110 facilitating operator customization of one or more performance characteristics of electric powersport vehicle 112 (referred hereinafter as "vehicle 112"). Vehicle 112 may be a PWC but it is understood that system 110 may also be used on other types of vehicles. Vehicle 112 may include elements of vehicle 12 described above. Like elements have been identified using reference numerals that have been incremented by 100. Vehicle 112 may include powertrain 116 (including motor 150), accelerator 124, controller 134, onboard antenna 144, instrument panel 132 providing onboard operator interface 26B. Vehicle 112 may also include key 146 engageable with receptacle 148.

Method 100 may include verifying an identity of an operator before regulating the output of electric vehicle 112 based on the value(s) of individually-variable operating parameter(s) 36. Method 100 may include selecting one or more operating parameters 36 based on operator ID 72 in order to regulate the output of electric vehicle 112 based on the applicable operating parameter(s) 36. In some embodiments, operator ID 72 may be received from a portable electronic device such as smartphone 28 associated with an operator and that is paired with controller 134 or that is detected to be within range for wireless communication with controller 134 via onboard antenna 144. The presence of smartphone 28 in proximity to vehicle 112 may be indicative of the identity of the operator that is operating or will shortly be operating vehicle 112.

In some embodiments, operator ID 72 may be received from key 146 that may be assigned to a specific operator of vehicle 112. The presence of key 146 in proximity to vehicle 112 or engaged with receptacle 148 may permit the activation and use of vehicle 112. In some embodiments, key 146 may be part of a radio-frequency identification (RFID) system of vehicle 112. Key 146 may include RFID tag 174 which may store operator ID 72 and/or one or more operating parameters 36 associated with the specific operator.

When triggered by an electromagnetic interrogation pulse from a RFID reader device associated with vehicle 112, RFID tag 174 may transmit digital data representative of operator ID 72 and/or operating parameter(s) 36. The digital data may then be received and used by controller 34 to regulate an output of motor 150 for example.

In some embodiments, RFID tag 174 may have read/write capabilities so that operating parameter(s) 36 may be written to and read from RFID tag 174. For example, operating parameter(s) 36 associated with operator ID 72 received via operator interfaces 26A or 26B may be written to RFID tag 174 via the RFID reader (which may also be a writer) associated with vehicle 112. It is understood that other suitable types of electrical or wireless data communication may be used to read and/or write data to/from key 146.

Key 146 may be attached to one end of tether 176. The opposite end of tether 176 may be attached to the vehicle operator's clothing, belt, or (e.g. for watercraft use) personal flotation device during operation of vehicle 112. The use of tether 176 may provide a capability of automatically shutting down or reducing the output of motor 150 if the operator should become separated from vehicle 112 and key 146 removed from receptacle 148.

In some embodiments, operator ID 72 may be received via (e.g., rotary) switch 178 that may be part of vehicle 112 for example. As shown in FIG. 5, switch 178 may permit the selection of operators OP1, OP2 or OP3. In response to such selection, controller 34 may use the appropriate set of operating parameters 36 associated with the applicable operator ID 72.

Figure 6:
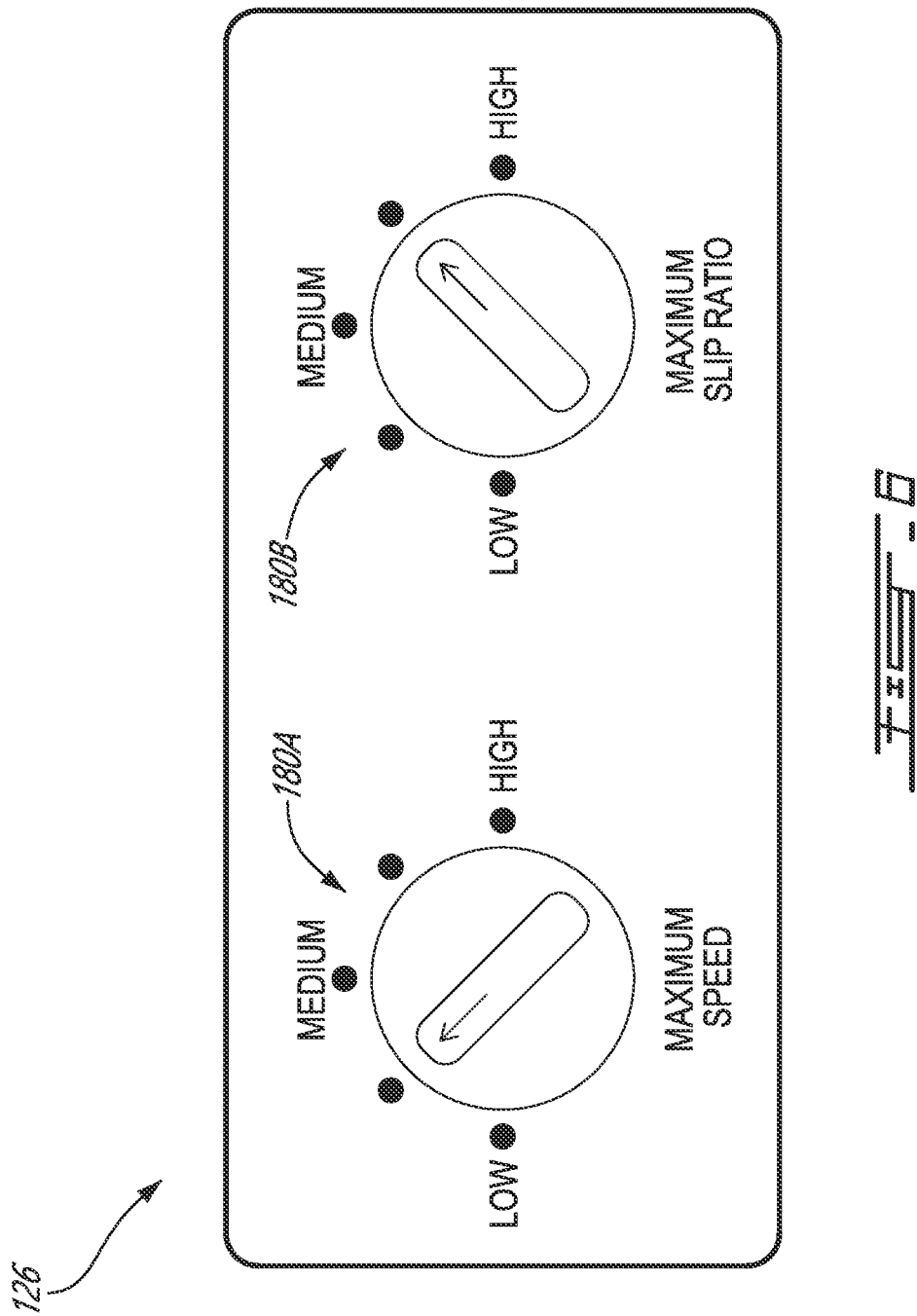
FIG. 6 shows an exemplary operator interface to facilitate an input of operating parameters for a vehicle.

FIG. 6 shows an exemplary operator interface 126 to facilitate the input of operating parameters 36 for vehicle 12, 112. Elements of operator interface 126 may be combined with elements of other operator interfaces described herein. Operator interface 126 may be an external operator interface separate from vehicle 12, 112 but in communication with vehicle 12, 112, or may be an onboard operator interface part of instrument panel 32, 132 of vehicle 12, 112. Operator interface 126 may include one or more widgets 180A, 180B for direct manipulation by the operator for specifying operating parameter(s) 36. Widgets 180A, 180B may include rotary switches, other physical buttons, knobs, dials, and/or graphical objects on a graphical interface as explained below. Widgets 180A, 180B may be actuatable between predetermined values available to the operator. In some embodiments, the values may be numerical values (discrete numbers or percentages), or may be relative values such as LOW, MEDIUM and HIGH for example.

Operating parameters 36 may be associated with propulsive performance characteristics of vehicle 12, 112. Propulsive performance characteristics may relate to the output of powertrain 16, 116 and/or the output of motor 50, 150 which causes the propulsion of vehicle 12, 112. Accordingly, the operator definition of operating parameters 36 may be used to customize the propulsive behaviour of vehicle 12, 112. Non-limiting examples of parameters 36 defining propulsive performance characteristics of vehicle 12, 112 may include or may be indicative of: a maximum speed of electric vehicle 12, 112; a maximum acceleration of electric vehicle 12, 112; a maximum output torque of motor 50, 150; a torque curve associated with motor 50, 150; a maximum output power of motor 50, 150; a throttle map associated with accelerator 24; a regeneration behaviour of electric vehicle 12, 112; a power versus speed curve associated with motor 50, and a maximum allowable amount of slippage (e.g., slip ratio) associated with a ground-engaging member of vehicle 12, 112. The regulation of the output of motor 50, 150 may be based on operator-defined values of one, two or more of the above operating parameters 36. In operator interface 126, widget 180A may be associated with the operator selection of a maximum speed of vehicle 12, 112, and widget 180B may be associated with the operator selection of a maximum slip ratio.

Figure 7:
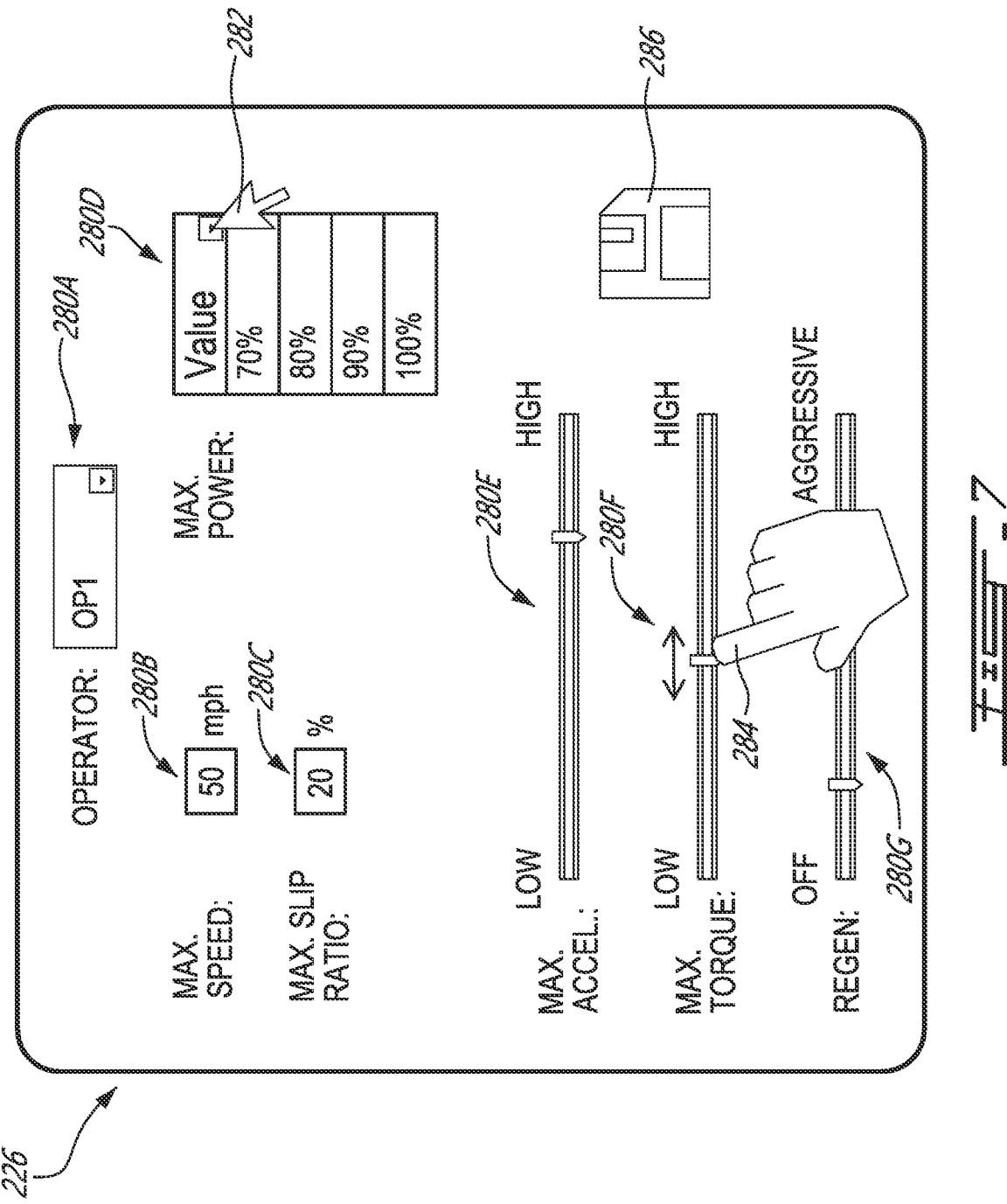
FIG. 7 shows another exemplary operator interface to facilitate the input of operating parameters for a vehicle.

FIG. 7 shows another exemplary operator interface 226 to facilitate the input of operating parameters 36 for vehicle 12, 112. Elements of operator interface 226 may be combined with elements of other operator interfaces described herein. Operator interface 226 may be an external operator interface separate from vehicle 12, 112 but in communication with vehicle 12, 112, or may be an onboard operator interface part of instrument panel 32, 132 of vehicle 12, 112. Operator interface 226 may include one or more widgets 280A-280G usable by the operator to specify operating parameter(s) 36. Operator interface 226 may be provided on a display screen, which may be touch-sensitive in some embodiments. Some or all of widgets 280A-280G may be graphical objects. The operator may interact with interface 226 via a cursor control device for causing movement of cursor 282, with finger 284 in case of a touch-sensitive display being used, and/or a keypad permitting the entry of numerical values. Operator interface 226 may be used to specify one or more operator-defined operational limits of vehicle 12, 112.

Individually-variable operating parameters 36 may be operator-defined using numerical or relative values. In some embodiments, the values of operating parameters 36 may be integers and/or real numbers. In some embodiments, the values of operating parameters 36 may have zero, one or more decimal places. In some embodiments, a value of an operating parameter 36 may be selectable from a predefined number of (e.g., three to five) options. In some embodiments, a value of an operating parameter 36 may be selectable within a predefined range.

Widget 280A may be used to select an operator ID 72 with which operating parameters 36 displayed on operator interface 226 are to be associated. Widget 280A may include a pull-down menu presenting a list of available options. Widget 280B may include a text field for entering (e.g., typing) a numerical value of the maximum allowable speed of vehicle 12, 112. Widget 280C may include a text field for entering (e.g., typing) a percentage value indicative of the maximum allowable slip ratio associated with the ground engaging member of vehicle 12. Widget 280D may include a pull-down menu presenting a list of available options for the selection of the maximum allowable output power from motor 50, 150. Widget 280E may include a horizontal or vertical slider for specifying a relative or numerical value indicative of the maximum allowable acceleration of vehicle 12, 112. Widget 280F may include a horizontal or vertical slider for specifying a relative or numerical value indicative of the maximum allowable output torque from motor 50, 150. The use of a slider may allow the selection of a value from of a discrete number of values spaced apart along the slider. Alternatively, the use of a slider may allow the selection of a numerical value from an infinite number of values available along the slider. The slider may represent a scale of numerical values available within a normalized range of zero to 10 for example.

Widget 280G may include a horizontal or vertical slider for specifying a relative or numerical value indicative of a regeneration behaviour of vehicle 12, 112. The regeneration behaviour may define how motor 50, 150 may be used as a generator to convert some of the kinetic energy lost when decelerating back into stored energy in battery 52. Widget 280G may be used to define a regeneration behaviour that is less or more aggressive. In some embodiments, the regeneration behaviour could be adjustable via a suitable widget with only two discrete settings for setting the regeneration to either ON or OFF. In some embodiments, the regeneration behaviour could be adjustable via a suitable widget with a plurality of discrete settings for setting the regeneration to one of a plurality of (e.g., three or more) predefined levels.

Once the definition of values for operating parameters 36 has been completed, save button 286 may be pressed for saving the values against the selected operator ID 72 for future use by controller 34, 134. In some embodiments, the defined operating parameters 36 may not necessarily be associated with an operator ID 72, and may just be stored temporarily until vehicle 12, 112 is shut off. For example, operating parameters 36 may be automatically returned to default values after vehicle 12, 112 is shut off and reactivated. Widget 280A may include a pull-down menu presenting a list of available options.

In some embodiments, operator ID 72 may represent a profile name that may be operator-defined and used to save an operator-defined operational mode for vehicle 12, 112. The operator-defined operational mode may be defined by the group of individually-variable operating parameters 36 available in operator interface 226 and/or other operator interface(s) for defining additional individually-variable operating parameters 36. The use of several operator IDs 72 may be used to save preferred operator-defined operational modes that may be readily accessed and used by the operator when vehicle 12, 112 is used. The large number of possible combinations of individually-variable operating parameters 36 available may allow the operator to define and save a few or several personalized operational modes for vehicle 12, 112. The operator-defined operational modes may be associated with different operators of vehicle 12, 112, with different personal preferences of the same operator, and/or with different operating conditions of vehicle 12, 112.

Figure 8:
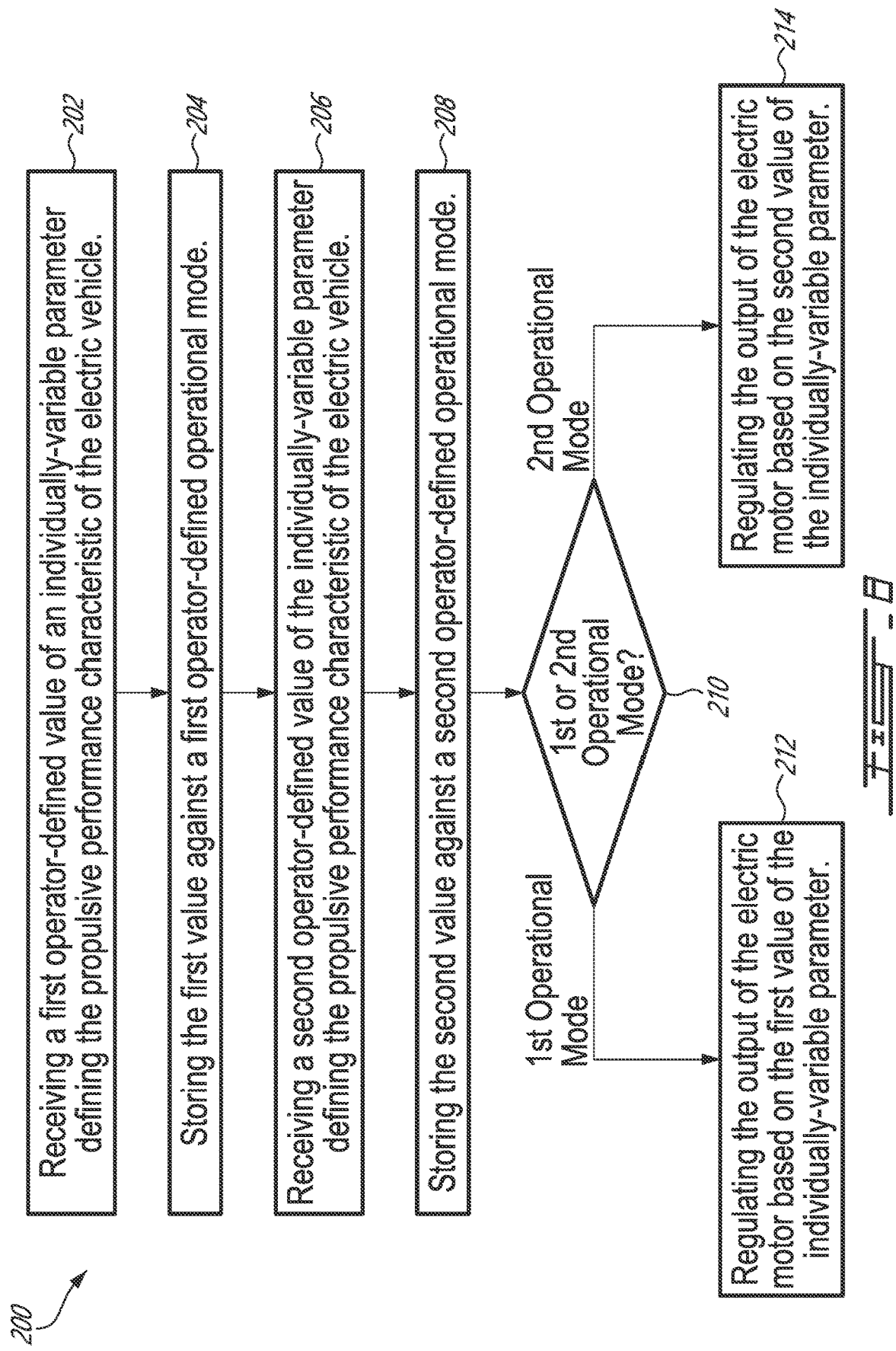
FIG. 8 is a flow diagram of another method of operating an electric vehicle.

FIG. 8 is a flow diagram of an exemplary method 200 of operating vehicle 12, or another electric vehicle such as vehicle 112 shown in FIG. 5. For example, machine-readable instructions 62 may be configured to cause controller 34 to perform some or all of method 200. Aspects of method 200 may be combined with aspects of other methods described herein. Aspects of vehicles described herein may also be incorporated into method 200. Method 200 may facilitate the operation of electric vehicle 12 based on one or more operator-defined propulsive performance characteristics of electric vehicle 12. In various embodiments, method 200 may include:

receiving a first operator-defined value of an individually-variable parameter 36 defining the propulsive performance characteristic of electric vehicle 12 (block 202);
storing the first value against a first operator-defined operational mode (e.g., operator ID 72) (block 204);
receiving a second operator-defined value of the individually-variable parameter 36 defining the propulsive performance characteristic of electric vehicle 12 (block 206);
storing the second value against a second operator-defined operational mode (e.g., operator ID 72) (block 208);
driving electric motor 50 of electric vehicle 12 to propel electric vehicle 12 according to the first or second operational mode (block 210);
when electric motor 50 is driven according to the first operational mode, regulating the output of electric motor 50 based on the first value of the individually-variable parameter 36 (block 212); and
when electric motor 50 is being driven according to the second operational mode, regulating the output of electric motor 50 based on the second value of the individually-variable parameter (block 214).

As explained below in relation to FIGS. 9 and 10, individually-variable parameter 36 may be two-dimensional.

At block 210, the selection of the applicable operational mode may be made manually by the operator using rotary switch 178 in FIG. 5 for example, or may be made automatically based on an automatic identification of the operator using key 146 or a portable electronic device such as smartphone 28 for example. In some embodiments of method 200, the first operator-defined operational mode may be associated with a first operator ID 72, and the second operator-defined operational mode may be associated with a second operator ID 72. Method 200 may include verifying an identity of the operator, and automatically selecting the first or second operational mode for driving electric motor 50 based on the identity of the operator.

Figure 9:
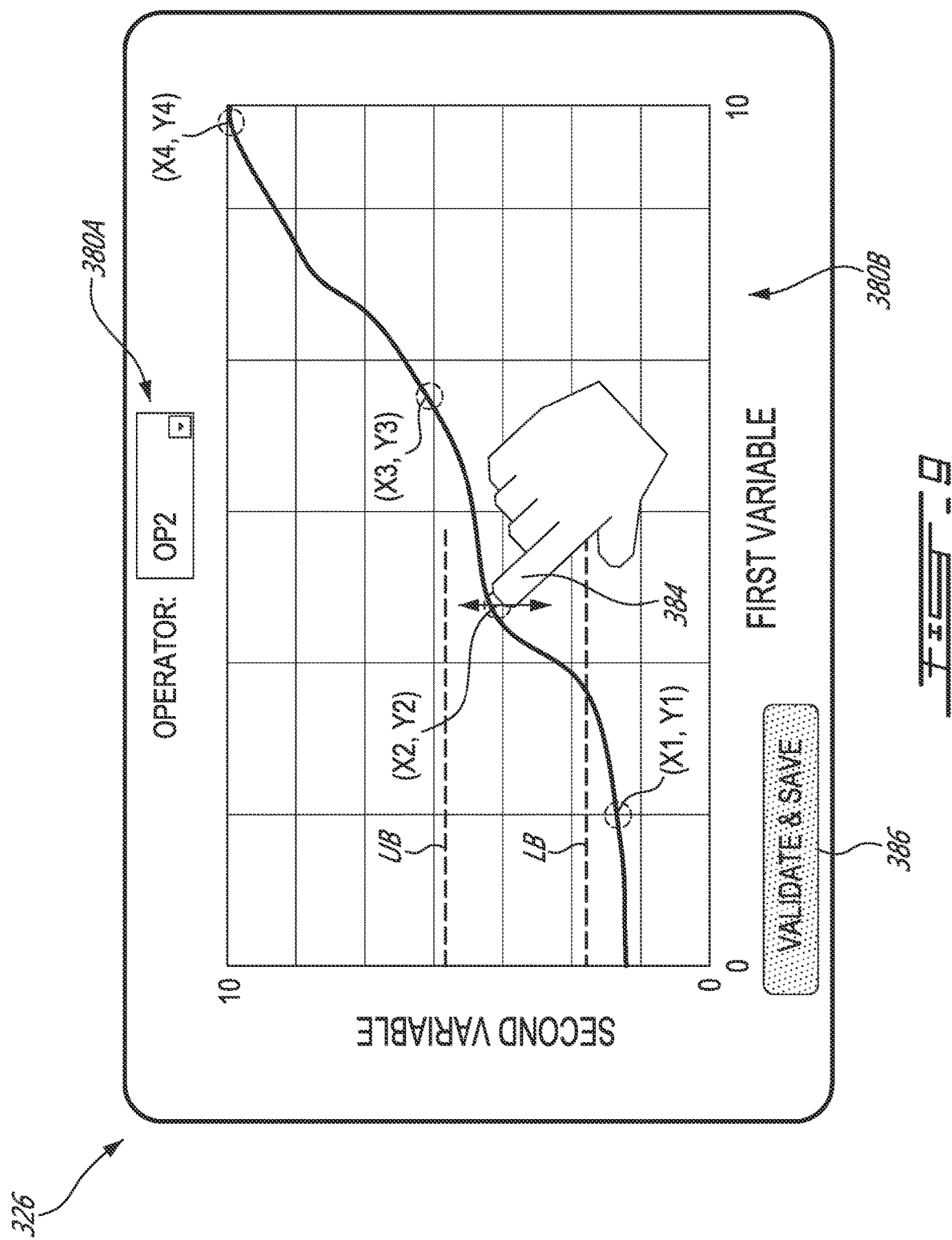
FIG. 9 shows another exemplary operator interface to facilitate the input of operating parameters for a vehicle.

FIG. 9 shows another exemplary operator interface 326 to facilitate the input of operating parameters 36 for vehicle 12, 112. Elements of operator interface 326 may be combined with elements of other operator interfaces described herein. Operator interface 326 may be an external operator interface separate from vehicle 12, 112 but in communication with vehicle 12, 112, or may be an onboard operator interface part of instrument panel 32, 132 of vehicle 12, 112. Operator interface 326 may include one or more widgets 380A and 380B usable by the operator to specify operating parameter(s) 36. Operator interface 326 may be provided on a display screen, which may be touch-sensitive in some embodiments. Some or all of widgets 380A and 380B may be graphical objects.

Widget 380A may be used to select operator ID 72 with which operating parameters 36 displayed on operator interface 326 are to be associated. In some embodiments, the defined operating parameters 36 may not necessarily be associated with an operator ID 72, and may just be valid (e.g. stored) temporarily until vehicle 12, 112 is shut off. For example, operating parameters 36 may be automatically returned to default values after vehicle 12, 112 is shut off. Widget 380A may include a pull-down menu presenting a list of available options.

In some embodiments, the value(s) of parameter(s) 36 may be multi- (e.g., two-) dimensional. For example, a two-dimensional value may include one or more points along a graph of a relationship between two variables. The two-dimensional value may include two coordinates such as (X1, Y1), (X2, Y2), (X3, Y3) and (X4, Y4) as illustrated in widget 380B of FIG. 9. In some embodiments, operator interface 326 may provide a table of X and Y coordinates that is modifiable by the operator. In some embodiments, operator interface 326 may present a plot graphically showing a baseline relationship that can be modified by the operator by using finger 384 or other input device to move/drag one or more points of the graph to define a custom relationship based on the baseline relationship or a previously defined relationship.

In some embodiments, the plot shown in FIG. 9 may be modifiable at any point along the plot. In some embodiments, the plot shown in FIG. 9 may be modifiable at one or more predefined operator-selectable nodes such as (X1, Y1), (X2, Y2), (X3, Y3) and (X4, Y4) as shown in FIG. 9 to provide one or more limited locations at which the plot may be modified by the operator.

In some embodiments, the validity of value(s) of parameter(s) 36 may be verified prior to using the value(s) to regulate the output of motor 50, 150. Such validation may include verifying whether the value(s) of parameter(s) 36 are within a predefined valid range for vehicle 12, 112. The range may be predetermined based on the capabilities of vehicle 12, 112 and/or on safety considerations. For example, invalid values may be values that are outside the capabilities of vehicle 12, 112 or motor 50, 150. In other examples, invalid values may be values that would cause the vehicle 12, 112 or motor 50, 150 to operate in an unsafe manner. In some embodiments, the operator may be prevented from entering invalid values by way of upper bound UB and lower bound LB displayed on operator interface 326 for example. In some embodiments, the operator interface may prevent the operator from entering invalid values. Once the definition of values for operating parameters 36 has been completed, validate & save button 386 may be pressed for validating and saving the values against the selected operator ID 72 for future use by controller 34, 134. In some embodiments, a suitable warning message may be provided to the operator if an invalid value has been entered. The validation of the value(s) may be used to prevent regulating the output of electric motor 50, 150 using invalid value(s) of parameter(s) 36.

In some embodiments, the validity verification of the values entered for operating parameters 36 may be variable and context-specific. For example, the specification of a first operating parameter 36 may cause a valid range of values for a second operating parameter 36 to be altered in case where the first and second operating parameters 36 may be related. In other words, the validity-checking mechanism defined herein may be dynamically variable. In the case of the plot in FIG. 9 representing a throttle map associated with accelerator 24, 124 for example, a previous definition of a maximum output torque of motor 50, 150 via widget 280F of FIG. 7 could potentially influence the position of upper bound UB associated with second node (X2, Y2) shown in FIG. 9. In case of a throttle map again, the position of upper bound UB associated with second node (X2, Y2) may be influenced by the position of third node (X3, Y3) shown in FIG. 9 in order to keep a Y-value of upper bound UB below value Y3 for example. Similarly, in another example, the position of lower bound LB associated with second node (X2, Y2) may be influenced by the position of first node (X1, Y1) shown in FIG. 9 in order to keep a Y-value of lower bound LB above value Y1 for example.

In some embodiments, one of the first and second variables shown in FIG. 9 may be indicative of a speed of vehicle 12, 112. In some embodiments, one of the first and second variables shown in FIG. 9 may be indicative of an operating speed of motor 50, 150. In some embodiments, one of the first and second variables shown in FIG. 9 may be indicative of an acceleration of vehicle 12, 112. In some embodiments, one of the first and second variables shown in FIG. 9 may be indicative of an output power of motor 50, 150. In some embodiments, one of the first and second variables shown in FIG. 9 may be indicative of an output torque of motor 50, 150. In some embodiments, one of the first and second variables shown in FIG. 9 may be indicative of a maximum amount of slippage allowable between the ground-engaging member of vehicle 12 and the ground. In some embodiments, the first variable along the X-axis may be a time scale. In some embodiments, the second variable along the Y-axis may be a current or a voltage of the electric power supplied to motor 50, 150.

In some embodiments, the relationship shown in FIG. 9 may define a throttle map associated with accelerator 24, 124 of vehicle 12, 112. For example, the first variable on the X-axis may be a displacement or position of accelerator 24, 124 of electric vehicle 12, 112 and the second variable on the Y-axis may be indicative of a corresponding output of motor 50, 150 or of powertrain 16, 116. In various embodiments, the second variable may be any one of the following: a speed of vehicle 12, 112; an operating speed of motor 50, 150; an acceleration of vehicle 12, 112; an output power of motor 50, 150; an output torque of motor 50, 150; a magnitude of an electric current supplied to motor 50, 150; and a maximum amount of slippage allowable between the ground-engaging member of vehicle 12 and the ground for example.

Figure 10:
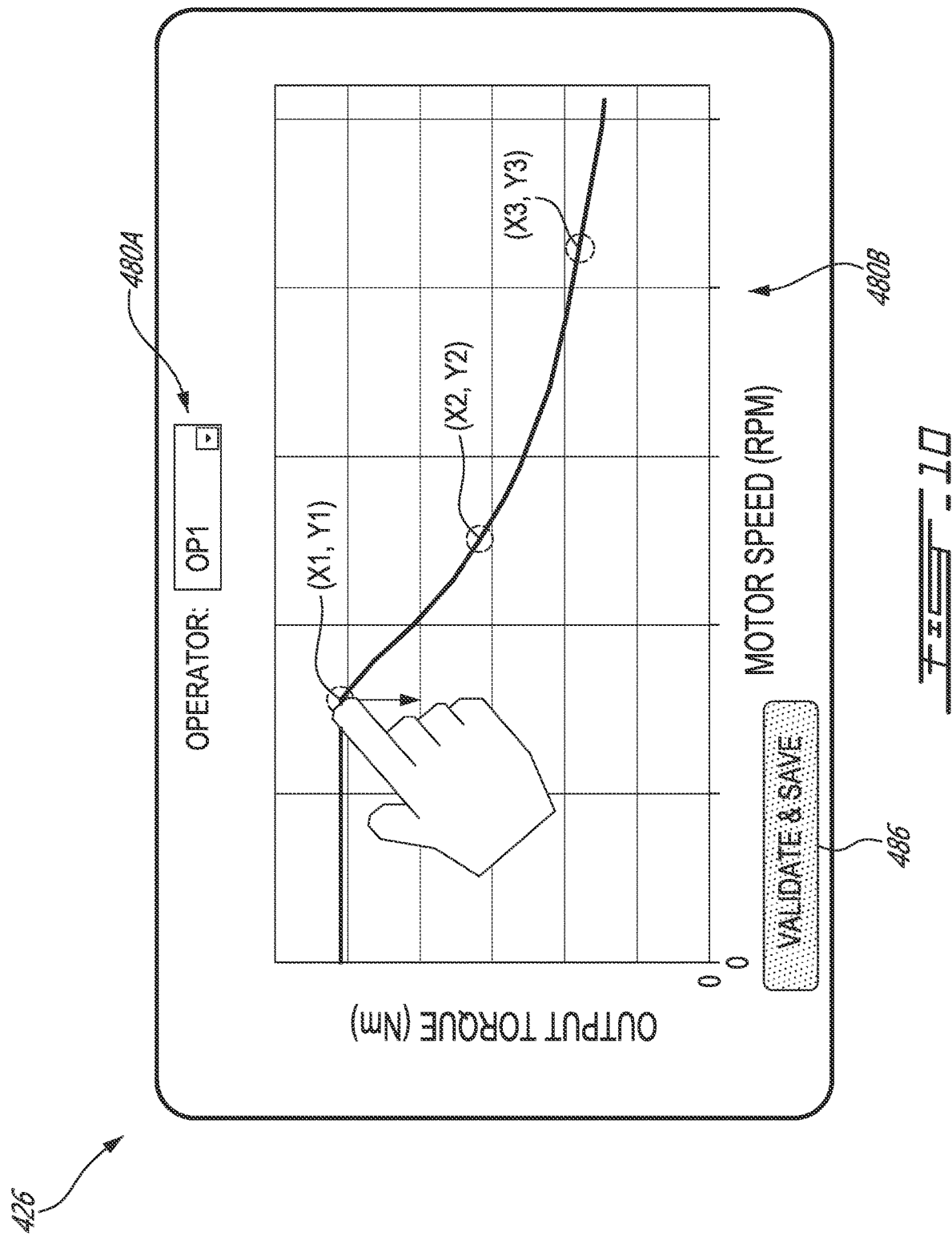
FIG. 10 shows another exemplary operator interface to facilitate the input of operating parameters for a vehicle.

FIG. 10 shows another exemplary operator interface 426 to facilitate the input of operating parameters 36 for vehicle 12, 112. Elements of operator interface 426 may be combined with elements of other operator interfaces described herein. Operator interface 426 may be an external operator interface separate from vehicle 12, 112 but in communication with vehicle 12, 112, or may be an onboard operator interface part of instrument panel 32, 132 of vehicle 12, 112. Operator interface 426 may include one or more widgets 480A and 480B usable by the operator to specify operating parameter(s) 36. Operator interface 426 may be provided on a display screen, which may be touch-sensitive in some embodiments. Some or all of widgets 480A and 480B may be graphical objects.

Widget 480A may be used to select operator ID 72 with which operating parameters 36 displayed on operator interface 426 are to be associated. Widget 480A may include a pull-down menu presenting a list of available options. Once the definition of values for operating parameters 36 has been completed, validate & save button 486 may be pressed for validating and saving the values against the selected operator ID 72 for future use by controller 34, 134.

FIG. 10 illustrates an example of a graph of a relationship between two variables. FIG. 10 illustrates an exemplary torque curve for motor 50, 150 where the X-axis represents the operating speed of motor 50, 150 and the Y-axis represents the corresponding output torque of motor 50, 150. The two-dimensional relationship may be defined by values including two coordinates such as (X1, Y1), (X2, Y2) and (X3, Y3) as illustrated in widget 480B. In some embodiments, operator interface 426 may provide a table of X and Y coordinates modifiable by the operator. In some embodiments, operator interface 426 may present a plot graphically showing a baseline torque curve that can be modified by the operator by using finger 484 or other input device to move/drag one or more points of the graph to define a custom torque curve. In some embodiments, the plot shown in FIG. 10 may be modifiable at any point along the plot. In some embodiments, the plot shown in FIG. 10 may be modifiable at one or more predefined nodes such as (X1, Y1), (X2, Y2) and (X3, Y3) as shown in FIG. 10 to provide one or more limited locations at which the plot may be modified by the operator.

Figure 11:
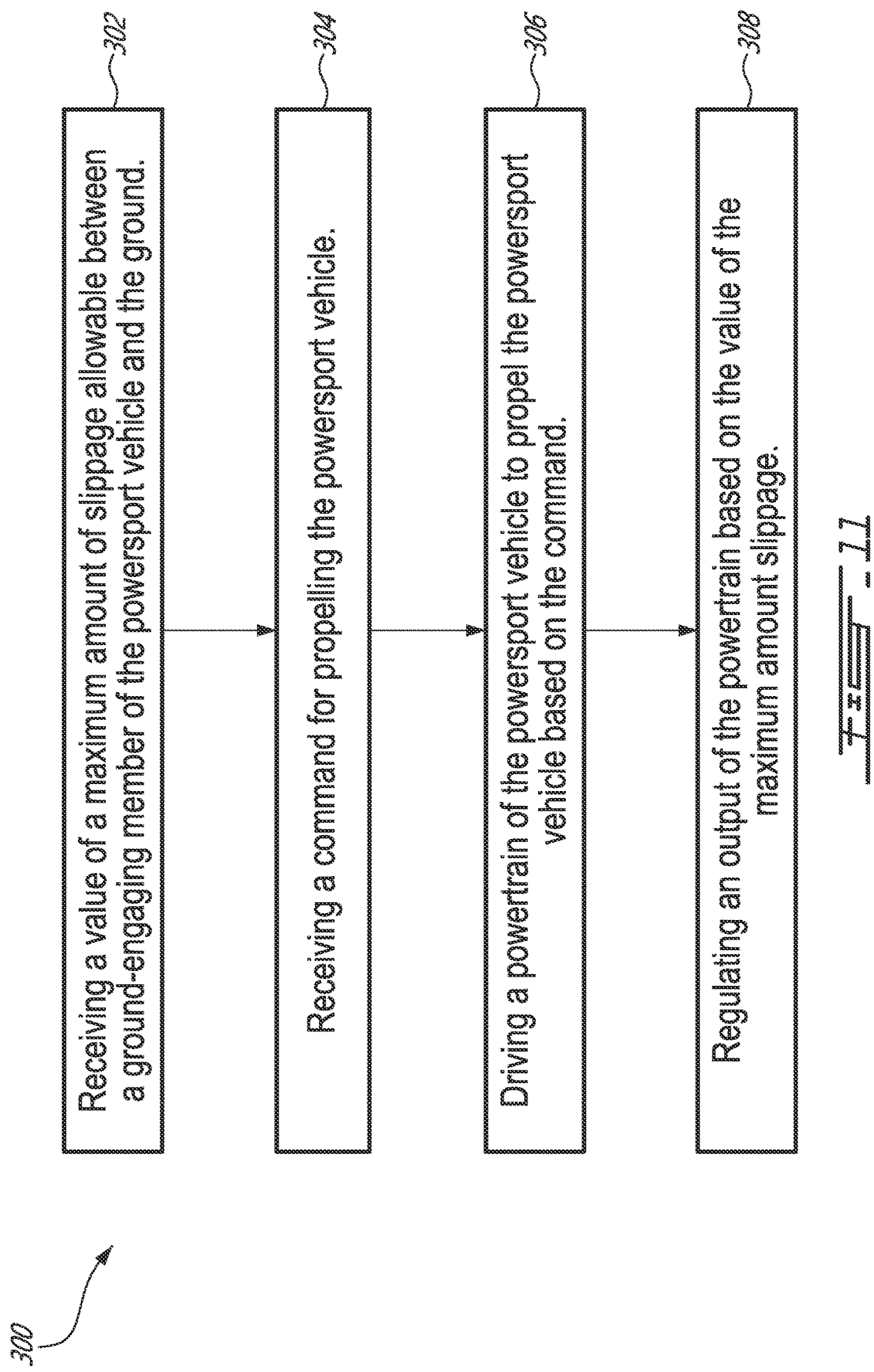
FIG. 11 is a flow diagram of a method of operating a powersport vehicle.

FIG. 11 is a flow diagram of an exemplary method 300 of operating vehicle 12, or another vehicle. Method 300 may be used with electric powersport vehicles or other powersport vehicles propelled by an internal combustion engine. Machine-readable instructions 62 may be configured to cause controller 34 to perform at least part of method 300. Aspects of method 300 may be combined with aspects of other methods described herein. Aspects of vehicles described herein may also be incorporated into method 300. In various embodiments, method 300 may include:

receiving a value of a maximum amount of slippage allowable between the ground-engaging member (e.g., track 15 or wheel) of vehicle 12 and the ground (block 302);

receiving a command for propelling vehicle 12 (block 304);

driving powertrain 16 of vehicle 12 to propel vehicle 12 based on the command (block 306); and when powertrain 16 is being driven, regulating an output of powertrain 16 based on the value of the maximum amount slippage (block 308).

Further aspects of method 300 are described in relation to FIG. 12.

FIG. 12 is a schematic representation of vehicle 12 of FIG. 1 with ground-engaging track 15 exhibiting slippage relative to ground G. Such slippage may occur during a sudden or relatively high output torque of motor 50 in an attempt to achieve a high acceleration of vehicle 12. Such slippage may also occur when vehicle 12 is attempting to climb a hill where vehicle 12 may be oriented at inclination angle α. The slippage may occur when a linear speed ST of track 15 is different from speed SV of vehicle 12 so that ST≠SV. During an attempted acceleration of vehicle 12, linear speed ST of track 15 may be higher than speed SV of vehicle 12 so that ST>SV. The slippage may be indicative of insufficient traction between track 15 and ground G to achieve the commanded behaviour of vehicle 12 according to the command received via accelerator 24.

Method 300 may include determining an actual amount of slippage between track 15 and ground G, and regulating the output (e.g., speed, power) of powertrain 16 to maintain the actual amount of slippage at or below the maximum allowable amount of slippage defined by the operator. In some embodiments, regulating the output of powertrain 16 may include overriding the command received via accelerator 24. The slippage may indicate a loss of traction for vehicle 12 and regulating the output of powertrain 16 based on the maximum allowable amount of slippage may help vehicle 12 re-gain traction in some situations.

Determining the actual amount of slippage may include using a theoretical speed of vehicle 12 determined from an operating speed of powertrain 16 (e.g., operating speed of motor 50) of vehicle 12, and an estimated actual speed of vehicle 12. The estimated actual speed of vehicle 12 may be determined using a rate of change of the position of vehicle 12 determined using GPS receiver 68. Alternatively or in addition, the estimated actual speed of vehicle 12 may be determined using accelerometer 70.

When method 300 is used with an electric powersport vehicle, regulating the output of powertrain 16 may include regulating the output (e.g., speed, torque, power) of motor 50. For example, regulating the output of motor 50 may include modulating the output torque of motor 50. In some embodiments, the maximum allowable amount of slippage may be defined by the operator in the form of a maximum allowable slip ratio according to equation 1 below where, for a snowmobile, ST is the linear speed of track 15 and SV is the speed of vehicle 12. In case of a wheeled vehicle, ST may be replaced with a tangential speed of a wheel/tire engaged with ground G.

$$\text{Slip Ratio (\%)} = \left(\frac{ST}{SV} - 1\right) \times 100\% \quad \text{Equation 1}$$

The embodiments described in this document provide non-limiting examples of possible implementations of the present technology. Upon review of the present disclosure, a person of ordinary skill in the art will recognize that changes may be made to the embodiments described herein without departing from the scope of the present technology. Further modifications could be implemented by a person of ordinary skill in the art in view of the present disclosure, which modifications would be within the scope of the present technology.

What is claimed is:

1. A method of operating an electric powersport vehicle based on an operator-defined propulsive performance characteristic of the electric vehicle, the method comprising:
   receiving, via an operator interface, a value of an individually-variable parameter defining the propulsive performance characteristic of the electric vehicle;
   receiving a command for propelling the electric vehicle;
   driving an electric motor of the electric vehicle to propel the electric vehicle based on the command; and
   when the electric motor is being driven, regulating an output of the electric motor based on the value of the individually-variable parameter.

2. The method as defined in claim 1, wherein the value includes a numerical value.

3. The method as defined in claim 1, wherein the value includes a relative value.

4. The method as defined in claim 1, wherein the parameter includes an operator-defined operational limit of the electric vehicle.

5. The method as defined in claim 1, wherein the parameter is indicative of an operator-defined maximum output power of a powertrain of the electric vehicle.

6. The method as defined in claim 1, wherein the parameter is indicative of an operator-defined maximum output torque of the electric motor.

7. The method as defined in claim 1, wherein:
   the parameter is two-dimensional; and
   the value includes two coordinates.

8. The method as defined in claim 7, wherein one of the coordinates includes one of the following: an operating speed of the electric motor, an actuation position of an accelerator of the electric vehicle, an output torque of the electric motor, and an acceleration of the electric vehicle.

9. The method as defined in claim 7, wherein the parameter is part of a throttle map associated with an accelerator of the electric vehicle.

10. The method as defined in claim 1, wherein the value includes one or more points along a graph of a relationship between two variables.

11. The method as defined in claim 1, comprising:
    verifying whether the value of the parameter is within a predefined range; and
    when the value is outside the predefined range, preventing regulating the output of the electric motor based on the value of the parameter.

12. The method as defined in claim 11, wherein:
    the parameter is a first individually-variable parameter; and
    the predefined range is variable based on a value of a second individually-variable parameter.

13. An electric powersport vehicle with operator-defined propulsive performance characteristics, the electric powersport vehicle comprising:

a powertrain for propelling the electric powersport vehicle, the powertrain including an electric motor and a battery for supplying electric power to the electric motor;

an accelerator for receiving a command for propelling the electric vehicle from an operator of the electric powersport vehicle; and a controller operatively connected to the accelerator and to the powertrain, the controller being configured to:
  receive an operator-defined value of an individually-variable parameter defining the propulsive performance characteristic of the electric vehicle;
  in response to the command received at the accelerator, cause the electric motor to be driven to propel the electric vehicle based on the command; and
  when the electric motor is being driven, cause an output of the electric motor to be regulated based on the value of the individually-variable parameter.

14. The electric powersport vehicle as defined in claim 13, wherein the value includes a numerical value.

15. The electric powersport vehicle as defined in claim 13, wherein the parameter is indicative of a difference between a theoretical speed of the electric vehicle determined from an operating speed of the powertrain, and an estimated actual speed of the electric powersport vehicle.

16. The electric powersport vehicle as defined in claim 15, comprising a satellite navigation device operatively connected to the controller for estimating the actual speed of the electric powersport vehicle.

17. The electric powersport vehicle as defined in claim 13, comprising a wireless data receiver operatively connected to the controller for receiving the operator-defined value of the individually-variable parameter.

18. The electric powersport vehicle as defined in claim 13, wherein:
  the parameter is two-dimensional; and
  the value includes two coordinates.

19. The electric powersport vehicle as defined in claim 13, wherein the parameter is indicative of a throttle map defining a relationship between an actuation position of the accelerator and an output of the electric motor.

20. The electric powersport vehicle as defined in claim 13, wherein the parameter is indicative of at least one of the following: an operator-defined maximum speed of the electric vehicle, an operator-defined maximum acceleration of the electric vehicle, an operator-defined maximum output torque from the electric motor, an operator-defined torque curve associated with the electric motor, and an operator-defined maximum output power from the electric motor.

21. The electric powersport vehicle as defined in claim 13, wherein the electric powersport vehicle is a snowmobile.

22. A computer program product for implementing an operation of an electric powersport vehicle according to an operator-defined propulsive performance characteristic of the electric powersport vehicle, the computer program product comprising a non-transitory computer readable storage medium having program code embodied therewith, the program code readable and executable by a computer, processor or logic circuit to perform a method comprising:
  facilitating receiving a value of an operator-defined individually-variable parameter defining the propulsive performance characteristic of the electric vehicle;
  causing an electric motor of the electric vehicle to be driven to propel the electric vehicle; and
  when the electric motor is being driven, causing an output of the electric motor to be regulated based on the value of the individually-variable parameter.

* * * * *